United States Patent [19]

Janssen

[11] Patent Number: 4,759,561

[45] Date of Patent: Jul. 26, 1988

[54] WHEELCHAIR WITH TILTING SEAT PART

[75] Inventor: Henricus T. J. Janssen, Oldenzaal, Netherlands

[73] Assignee: Huka Developments B.V., Netherlands

[21] Appl. No.: 57,165

[22] Filed: Jun. 1, 1987

[30] Foreign Application Priority Data

Jun. 5, 1986 [NL] Netherlands ........................ 8601457

[51] Int. Cl.⁴ ................................................ B62R 5/08

[52] U.S. Cl. ...................... 280/242 WC; 297/DIG. 4; 297/325; 297/261

[58] Field of Search ............... 280/242 WC, 289 WC; 297/DIG. 4, 325, 213, 261, 262

[56] References Cited

U.S. PATENT DOCUMENTS

| | | | |
|---|---|---|---|
| 3,415,531 | 12/1968 | Kiel | 297/261 |
| 4,383,714 | 5/1983 | Ishida | 297/325 |
| 4,479,626 | 10/1984 | Klüting et al. | 297/261 |

*Primary Examiner*—John J. Love
*Assistant Examiner*—Donn McGiehan
*Attorney, Agent, or Firm*—Allegretti, Newitt, Witcoff & McAndrews, Ltd.

[57] ABSTRACT

Wheelchair comprising an underframe with front and rear wheels, and a seat part (1) which is adjustable relative to the underframe, which seat part (1) can be tilted forward and backward relative to the underframe in such a way that the overall center of gravity (6) of seat part (1) and wheelchair user (5) essentially assumes a fixed position relative to the underframe.

7 Claims, 2 Drawing Sheets

WHEELCHAIR WITH TILTING SEAT PART

The invention relates to a wheelchair comprising an underframe with front and rear wheels, and a seat part which is adjustable relative to the underframe.

Such a wheelchair is known from, inter alia, EP-A-No. 0,162,835. Here the seat part is connected to the underframe in such a way that it tilts about a horizontal cross-shaft. This cross-shaft is at the same level as the seat of the seat part.

A tilting adjustment of the seat part of a wheelchair is used to permit the wheelchair user to develop dynamic sitting behaviour. This means that the user changes his or her sitting position several times a day. This is important from a medical point of view because a different sitting position varies the strain on the bottom and back. This reduces the chance of local tissue death (decubitus) due to capillary pressure in the blood vessels being too high. Users of wheelchairs without a tilting seat part often achieve the same effect by "lifting" several times a day. This means that the pressure is taken off the bottom for some time by raising the body a little using the arms.

In addition to the prevention of tissue death, a tilting adjustment combined with an adjustable back can be used for seeking a reflex-inhibiting position (a posture where fewer or no spasms occur).

A tilting adjustment also gives a wheelchair user the opportunity to select according to the use situation a sitting position which he or she finds comfortable in that use situation, e.g. active working position for working at a table or desk, transfer position for transferring to or from the wheelchair, passive position for watching television or reading a book and the like.

When the seat part in the wheelchair according to the above-mentioned European Patent Application is tilted relative to the underframe, the centre of gravity of the occupant is also shifted. This means that the stability of the wheelchair changes and that a large amount of energy must be expended or released. This means that such a tilting adjustment can hardly ever be carried out by the person sitting in the wheelchair, unless an external source of energy, e.g. electric motor, can be switched on or a transmission mechanism is installed. This source of energy must be built into the wheelchair, which greatly increases the weight of the wheelchair and increases costs.

The stability of the known wheelchair with tilting adjustment forwards and backwards is also jeopardized in this tilting method, with the result that the wheelchair can overturn.

In the field of rehabilitation three types of wheelchair are distinguished: the push wheelchair, the self-propelled type, and the electric wheelchair.

A push wheelchair is propelled by an attendant who pushes the wheelchair. For negotiating uneven surfaces the wheelchair is often tipped back, so that the front wheels are lifted off the ground and the obstacle can easily be overcome. A self-propelled wheelchair with large wheels at the rear is driven with hoops. A dexterous wheelchair user can make a "wheely" for negotiation of an uneven surface, in other words, he or she can travel on the two rear wheels. In the case of all wheelchairs it is important that the projected floor area should be as low as possible. However, this requirement conflicts with the required stability in the backward, forward and sideways directions.

An optimum is chosen here depending on the use environment (sloping surfaces or otherwise, uneven surfaces or otherwise).

The object of the invention is to avoid the disadvantages of the known wheelchairs, and this is achieved according to the invention in that the seat part can be tilted forward and backward relative to the underframe in such a way that the overall centre of gravity of seat part and wheelchair user essentially assumes a fixed position relative to the underframe.

This means that the stability of the wheelchair during and after the tilting is not changed relative to the set stability.

Due to the fact that the centre of gravity remains essentially in the same place, the tilting also requires little force.

According to a preferred embodiment of the invention, the tilting movement is essentially along a circular path with the said centre of gravity as the centre point.

Other advantages and features of the invention will emerge from the description which now follows, in which an example of an embodiment is described in greater detail with reference to schematic drawings.

Figure 1:
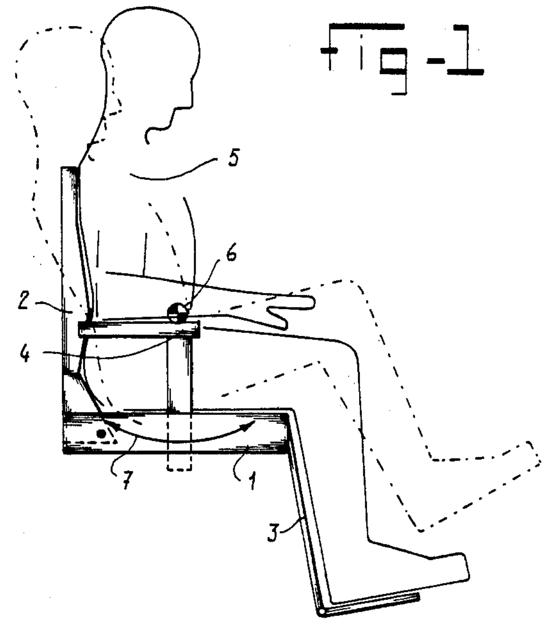
FIG. 1 shows a side view of the seat part of a wheelchair, with a person sitting in it.

FIG. 1 shows the seat part of the wheelchair, comprising a seat 1, a seat back 2, footrests 3, and armrests 4.

These parts can be of a conventional shape and may or may not be hingedly connected to each other.

The user of the wheelchair is indicated by 5, and the centre of gravity of the seat part +the user by 6.

If during tilting the seat part is moved along a circular path 7 relative to the underframe (not shown), with the centre of gravity 6 as the centre point, then the centre of gravity 6 remains where it is during the tilting.

Figure 2:
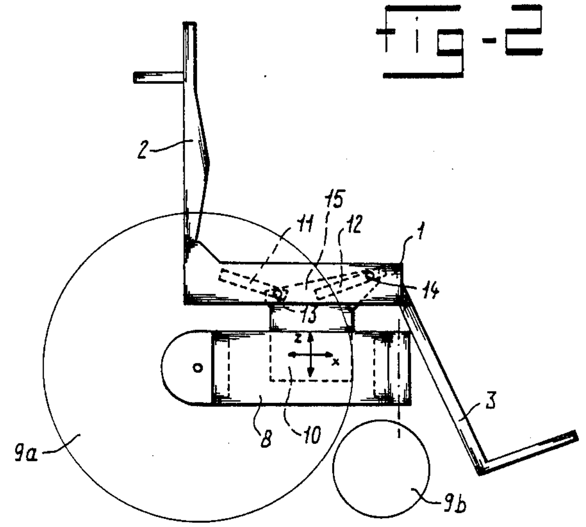
FIG. 2 shows a side view of a complete wheelchair.

In FIG. 2 the person 5 and the armrests 4 are omitted for the sake of clarity, but the underframe 8 with the rear wheels **9*a* and the front wheels 9*b*** are shown.

Construction parts 10 are connected in adjustable fashion to the underframe 8, both in the X and in the Z direction.

This adjustment takes place once, depending on the user. The best stability is obtained by adjustment in the X direction. Through adjustment in the Z direction, the wheelchair is adapted to the size and needs of the user.

The seat part is tiltably mounted by means of the seat 1 in the construction parts 10 on the two longitudinal sides of the seat 1.

Figure 3:
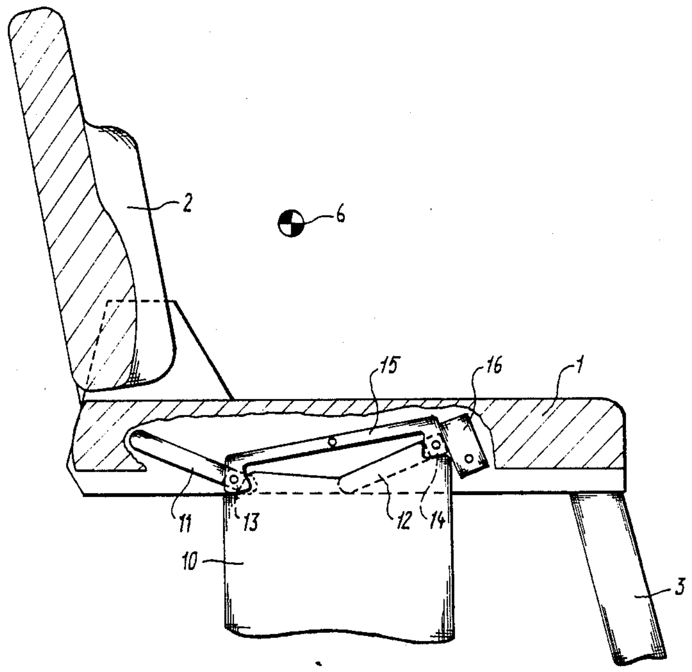
FIG. 3 shows a side view of part of the wheelchair on a larger scale.

As can be seen from FIGS. 2 and 3, the envisaged circular path 7 (see FIG. 1) can be approached by two straight guides 11 and 12, disposed in the two longitudinal sides of the seat 1.

Fitted in these guides 11 and 12 in the seat 1 are slide elements 13 and 14. These two slide elements 13 and 14 are connected to each other by means of a rodshaped element 15 which engages hingedly at both ends with the slide elements 13 and 14, and which is fixed, but detachably so, to the underframe, in this case to the construction part 10.

Such a guide construction is provided on both longitudinal sides of the seat 1.

In order to permit detachment of the underframe, for easier transportation and storage of the wheelchair, the two rod-shaped elements 15 can be connected to the construction parts 10 in such a way that they can be detached.

The guides 11, 12 and 13, 14 can be designed in various ways known in the art, such as gear rack constructions, screw spindle with nut, reel with rope or the like. The tilting movement can be driven with a hand crank or the like, or mechanically by means of a motor 16.

All that is important is that all slide elements should be displaced simultaneously in the guides.

With the wheelchair according to the invention, the seat part, comprising seat 1, back 2, footrests 3 and armrests 4, and a headrest if there is one, can thus be tilted relative to the underframe 8, 9, on which the wheels *9a* and *9b* are fixed.

The seat part can be positioned once relative to the underframe, with the object of being able to move the sitting centre of gravity, i.e. the common centre of gravity of occupant and seat part, relative to the underframe. In this way, the stability of the wheelchair can be set in an optimum manner in the backward and the forward direction for an individual user.

The most important feature of the invention is that during tilting of the seat part relative to the underframe no change takes place in the stability of the wheelchair as a whole in the forward and backward directions.

In order to achieve tilting of the seat part, all that is needed is to overcome the friction force. Since the sitting centre of gravity is not displaced in the vertical direction, no energy is released, and no energy need be supplied for vertical displacement of the centre of gravity.

I claim:

1. A wheelchair comprising a frame, wheels supporting said frame, a seat tilably mounted on said frame in a manner which maintains the stability of said chair during tilting, a tilting mechanism disposed at each side of said seat connecting said seat to said frame, each said mechanism comprising a pair of tracks fixed to said seat side and inclined downwardly at their inner ends a connecting rod pivotally mounted between its ends on said frame one end of said rod having a slide element mounted in one of said tracks, the other end of said rod having a slide element mounted in the other of said tracks, and means on said seat for moving said seat backward or forward on said inclined tracks to tilt the seat up or down at its front and back while the overall center of gravity of the seat and occupant assumes a fixed position relative to the frame.

2. The wheelchair of claim 1 in which said connecting rod is detachably secured to said frame.

3. The wheelchair of claim 1 in which said tracks are straight.

4. The wheelchair of claim 1 in which said moving means retains the seat in a fixed attitude except when the tiliting mechanism is in operation.

5. The wheelchair of claim 3 in which the distance between the ends of said rod is equal to the distance between the inner ends of tracks plus the length of one track.

6. The wheelchair of claim 1 in which said tracks have elongated slots and said slide elements on the ends of said rod are pins which slide in the slots.

7. The wheelchair of claim 2 which includes means interposed between said tilting mechanisms and said frame to move the seat and the mechanisms up or down, backward or forward to permit initial adjustment of the seat.

* * * * *